March 3, 1964 P. H. GOLDSMITH 3,122,941
TRANSMISSION CONTROL MECHANISM
Filed Jan. 15, 1962 3 Sheets-Sheet 2
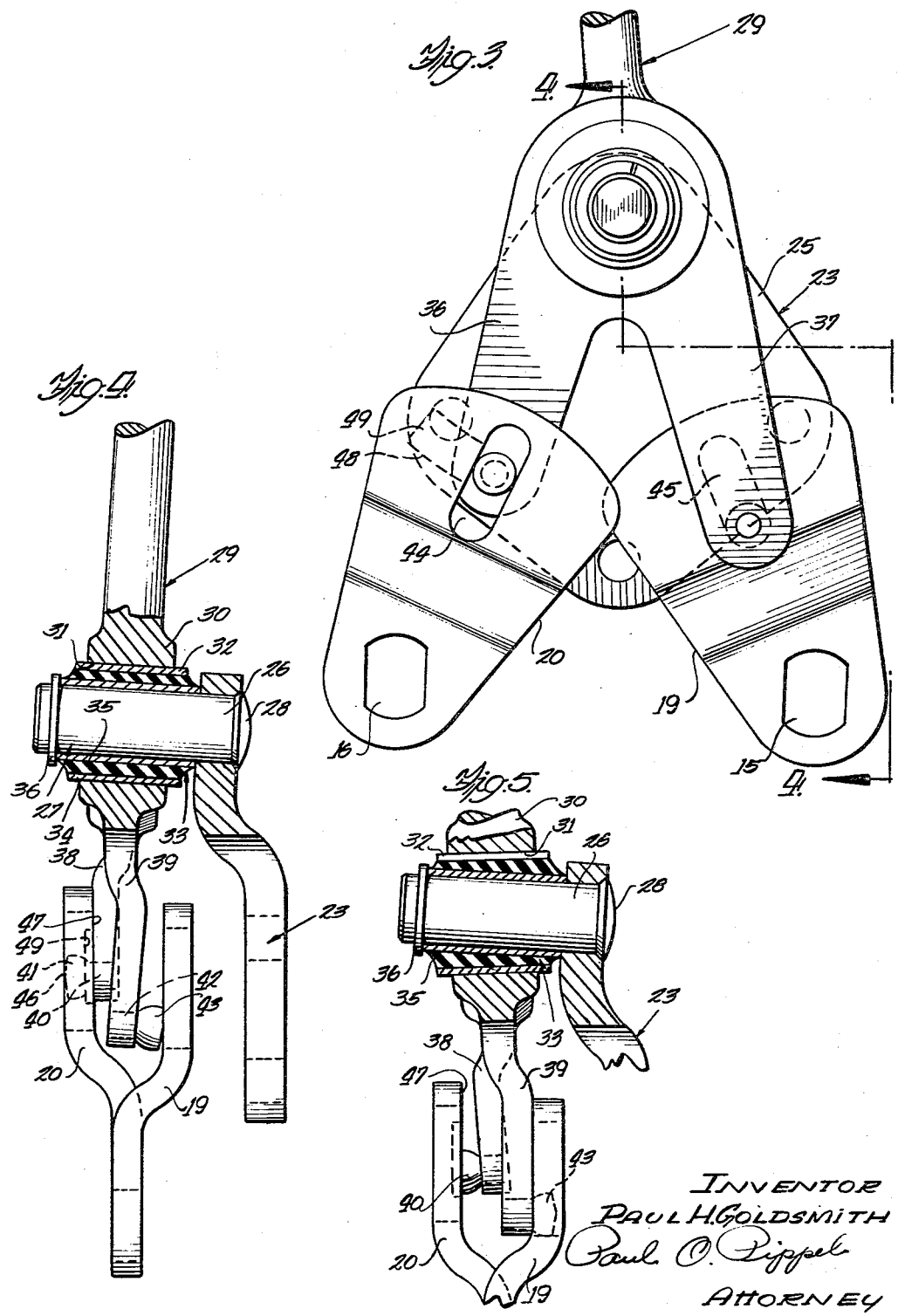
INVENTOR
PAUL H. GOLDSMITH
Paul O. Pippel
ATTORNEY March 3, 1964 P. H. GOLDSMITH 3,122,941
TRANSMISSION CONTROL MECHANISM
Filed Jan. 15, 1962 3 Sheets-Sheet 3
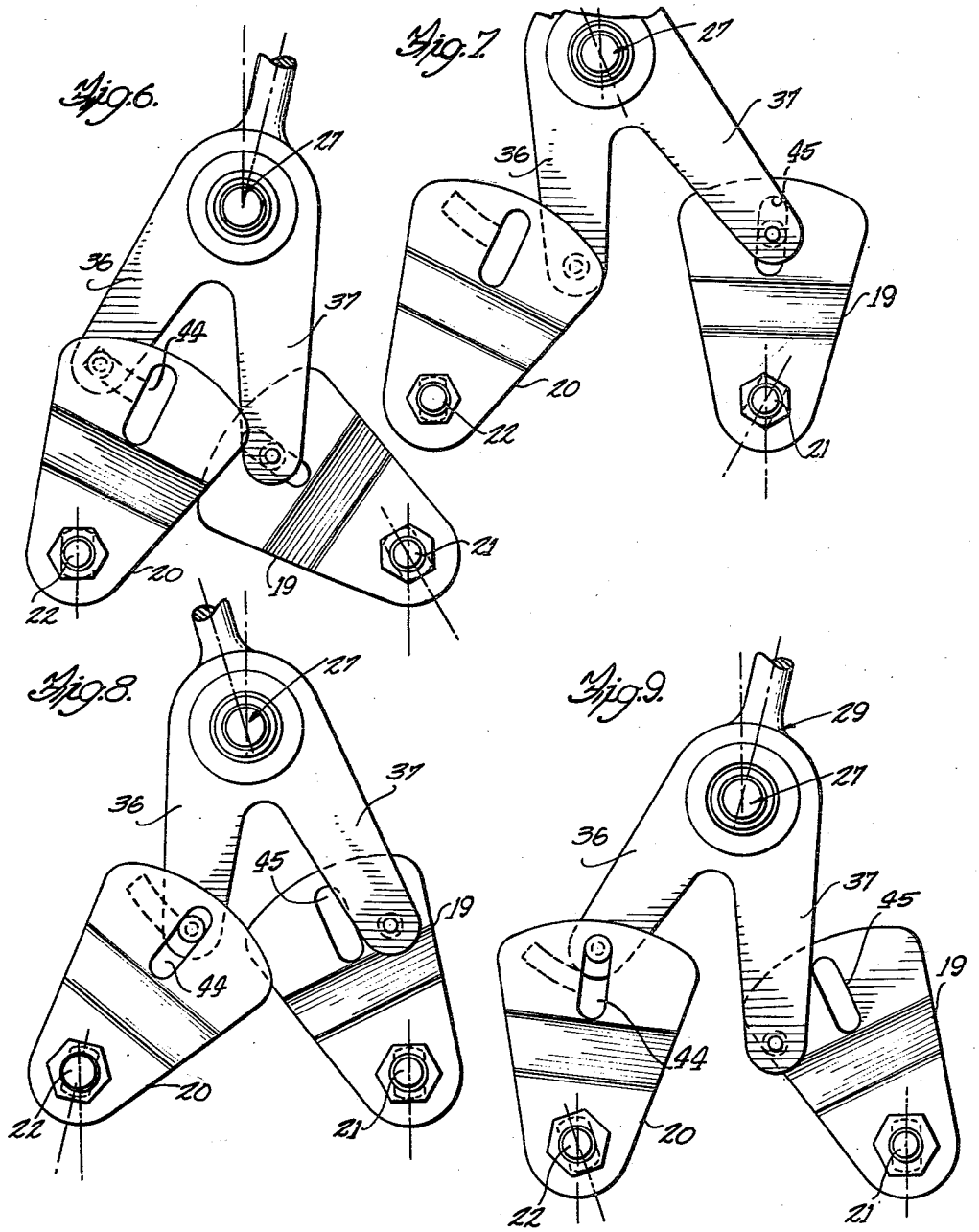
INVENTOR
PAUL H. GOLDSMITH
Paul O. Pippel
ATTORNEY

United States Patent Office 3,122,941
Patented Mar. 3, 1964

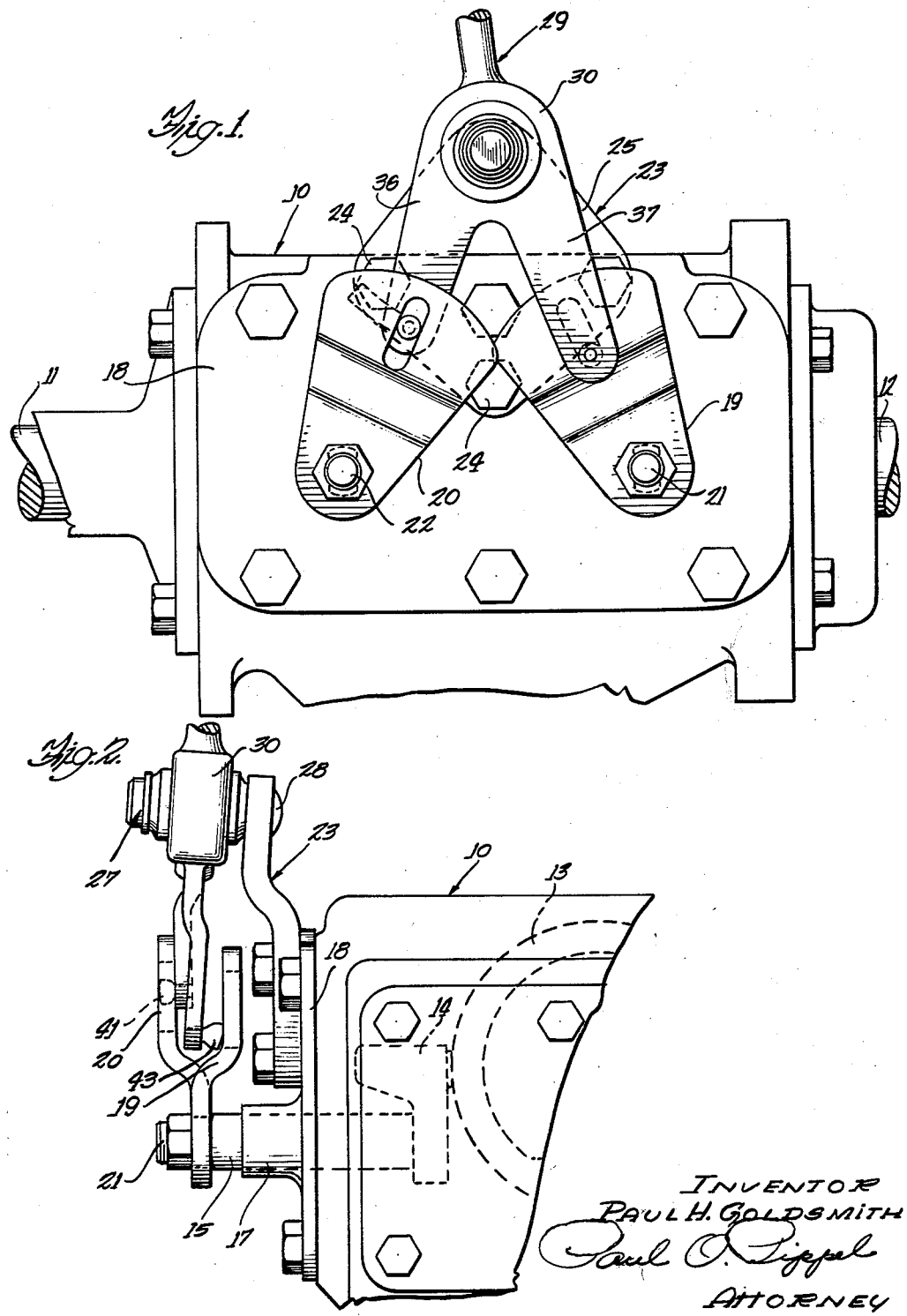

3,122,941
TRANSMISSION CONTROL MECHANISM
Paul H. Goldsmith, Fort Wayne, Ind., assignor to International Harvester Company, Chicago, Ill., a corporation of New Jersey
Filed Jan. 15, 1962, Ser. No. 166,216
11 Claims. (Cl. 74—473)

This invention relates to a transmission control mechanism and more particularly to a manually-operated control mechanism for a change speed transmission of the shiftable gear type usually employed in motor vehicles in order to effect various speed ratios between the driving and driven shafts of the transmission.

Power transmissions of the shiftable gear type are in widespread use in motor vehicles and generally embody constantly meshed sets of gears of different driving ratios and two or more sets of sliding gears or clutch elements. Each sliding gear or clutch element is usually selectively movable axially to establish a driving relationship between one of the constantly meshed sets of gears and a shaft to provide a particular speed ratio between the driving and driven shafts of the transmission. The shiftable clutch element is usually in the form of an integrally splined coupling slidable on an externally splined part of a shaft and is adapted to be engaged selectively with splined portions carried by certain gears of each constantly meshed sets of gears.

Oftentimes power transmissions of this type employ a pair of rockshafts suitably journaled in the gear housing. The rockshafts extend through a wall of the housing and exterior portions thereof are each provided with a lever fixed thereto. The inner ends of the rockshafts disposed within the gear housing carry forks for operatively engaging the shiftable clutch elements. In a three-speed transmission, one rockshaft is arranged to slidingly shift the second and direct speed gear clutch element when oscillated or rocked while the other rockshaft is arranged to slidingly shift the low and reverse clutch element when rocked. In most instances, rocking of the rockshafts is accomplished by a single control member or shift lever having two degrees of freedom of movement providing respectively for the selection of the particular rockshaft to be rocked and thus the clutch element to be shifted and for the subsequent rocking of the selected rockshaft in one direction or the other to effect shifting of the selected clutch element in one direction or the other. In many present-day vehicles, the control or shift lever is mounted adjacent the steering wheel in a position remote from the transmission and suitable connecting linkage between the lever and the transmission is provided. Oftentimes such connecting linkage is complicated and costly and frequently does not function as efficiently as desired. It is, therefore, an important object of the present invention to eliminate the necessity of utilizing such connecting linkage by providing a floor-mounted transmission control lever which is not only inexpensive to manufacture but which is sturdily built and is positive in its gear selecting and shifting operation.

Still another object is the provision of a transmission gear shift mechanism which is readily adaptable to be mounted on the housing of existing motor vehicle transmissions operated by a conventional remote control lever mounted adjacent the steering wheel of the motor vehicle so as to enable the vehicle to be modified inexpensively and efficiently by converting it to a floor-mounted transmission control vehicle.

The foregoing and other important objects and desirable features inherent in and encompassed by the invention, together with many purposes and uses thereof, will become readily apparent from a reading of the ensuing description in conjunction with the annexed drawing, in which:

FIGURE 1 is a side-elevational view of the transmission control mechanism mounted on the housing of a motor vehicle power transmission;

FIGURE 2 is an end-elevational view of the structure shown in FIGURE 1;

FIGURE 3 is an enlarged side view of the improved power transmission control mechanism, the mechanism being shown in its neutral setting;

FIGURE 4 is a vertical sectional view taken substantially along line 4—4 of FIGURE 3;

FIGURE 5 is a fragmentary view of the transmission control mechanism in the setting corresponding to first speed or low gear forward position or the reverse gear position;

FIGURE 6 is a side view corresponding to FIGURE 3 with the gear shift mechanism in the setting corresponding to first speed or low gear forward position;

FIGURE 7 is a view silimar to FIGURE 6 with the exception that the gear shift mechanism is in the setting corresponding to the reverse gear position;

FIGURE 8 is a side view of the gear shift mechanism shown in a position corresponding to the second speed or intermediate gear forward position, and FIGURE 9 is a view similar to FIGURE 8 with the exception that the power transmission control mechanism is in the position corresponding to the third speed or high gear forward position.

Referring to the drawings in detail wherein like reference characters represent like elements throughout the various views the housing 10 of a conventional shiftable gear type motor vehicle transmission is shown. The housing 10 rotatably supports a drive shaft 11 and a driven shaft 12 which are arranged with their longitudinal axes in longitudinal alignment. As in conventional motor vehicle transmissions of the three-speed forward, single-speed reverse, shiftable gear type to which the present invention relates, the driven shaft 12 carries a combined reverse and low gear which is slidable along the shaft in one direction to engage a reverse gear or in the other direction to engage a first or low speed gear, both of which are operatively connected to and driven by the drive shaft 11. The driven shaft 12 also has a second speed clutch element supported thereon for independent rotation and is drivingly connected to the drive shaft 11 by means of suitable reduction gearing. The drive shaft 11 carries a third speed or direct drive clutch member. A shiftable positive jaw clutch sleeve, non-rotatably secured to the driven shaft 12, is adapted to slide longitudinally in one direction to transmit power from the second speed clutch element to the driven shaft 12 or in the opposite direction to effect coupling of the direct drive clutch member to the driven shaft 12. The combined low and reverse gear and the slidable clutch sleeve are provided with annular grooves each of which is engaged by a shift fork. One of the shift forks 13 engaging the channel in the combined low speed and reverse gear is partially shown in FIGURE 2. Each shift fork is pivotally connected to one end of a respective arm and the opposite end of the arm is fixed to the innermost end of a respective rockshaft. The arm 14 pivotally connected to the shift fork is shown in FIGURE 2 and the rockshaft, designated by reference character 15, has the arm 14 non-rotatably connected thereto. It is to be understood that the rockshaft 16 is operatively connected to the shiftable clutch sleeve in the same manner that the rockshaft 15 is operatively connected to the combined low speed and reverse gear. The rockshafts 15 and 16 are journaled in bearing bosses 17 in a substantially vertical side wall 18 of the transmission housing 10 and project out of the housing 10. It will be noted that the rockshafts 15 and 16 are longitudinally spaced and parallel with respect to each other and lie substantially within a horizontal plane.

Inasmuch as the transmission gearing per se forms no part of the present invention, it is not illustrated in the drawings and has been briefly described hereinbefore only for establishing an environment for the invention.

The transmission control mechanism of the present invention includes a pair of generally pie cut shaped, platelike arms 19 and 20. The apex or lowermost end of the arm 19 is rigidly secured to the outermost end 21 of the rockshaft 15 and similarly the apex end of the arm 20 is rigidly secured to the outermost end 22 of the rockshaft 16. It will be noted in FIGURE 2, that while the apex end of both arms 19, 20 lie substantially in a vertical plane, the major portion of the arm 19 is offset laterally inwardly and the major portion of the arm 20 is offset laterally outwardly with the result that major portions of the arms 19, 20 are laterally spaced and parallel with respect to each other. It will also be noted that the major portions of the arms 19, 20 lie in planes which are perpendicular to the longitudinal axes of the rockshafts 15, 16. Each of the arms 19 and 20 are capable of occupying either of three operating positions. When the arms 19 and 20 are in the positions shown in FIGURE 1, which correspond to the neutral setting of the power transmission, the shiftable positive jaw clutch sleeve and the combined reverse and low gear are not in meshing engagement with the second speed clutch element, direct drive clutch member, low speed gear or the reverse gear and, consequently, the drive shaft 11 is drivingly disconnected from the driven shaft 12. When the arm 19 is swung counterclockwise from the position shown in FIGURE 1 to the position shown in FIGURE 6, which results in rocking of the rockshaft 15 in the same direction, the combined reverse and low gear is shifted along the axis of the driven shaft 12 causing a driving engagement relationship between the low or first speed gear of the transmission and the combined reverse and low gear to thus effect a low speed driving relation between the drive shaft 11 and the driven shaft 12. Similarly, when the arm 19 is swung in the opposite or clockwise direction, as viewed in FIGURE 1, from the neutral position to the position illustrated in FIGURE 7 a reverse speed ratio is effected in the transmission. In a similar manner, swinging of the arm 20 in a clockwise direction from the neutral position thereof depicted in FIGURE 1 effects an intermediate or second speed gear ratio in the transmission and when swung in the opposite or clockwise direction effects a third speed or direct drive ratio in the transmission. The two settings or positions the arm 20 is capable of assuming other than the neutral setting of the arm 20 are illustrated in FIGURES 8 and 9.

A mounting base in the form of a plate 23 is mounted on the exterior side of the vertical side wall 18 of the transmission housing 10 by means of a plurality of bolts 24. As best shown in FIGURES 1 and 2, a triangularly-shaped portion 25 of the mounting plate 23 extends vertically above the transmission housing 10 and is offset laterally from the vertical side wall 18. It will also be noted that the triangularly-shaped upper portion 25 of the mounting plate 23 lies in a plane which intersects the longitudinal axis of the rockshafts 15, 16 at an angle slightly less than 90° as viewed in FIGURE 2. The purpose of orienting the upper portion 25 of the mounting plate in this fashion will be apparent hereinafter. The uppermost apex end of the triangularly-shaped portion 25 is provided with an opening through which the cylindrical shank 26 of a pivot pin 27 extends. The enlarged head 28 of the pivot pin 27 is welded to the mounting plate 23.

From the foregoing, it will be appreciated that the pivot pin is longitudinally spaced substantially midway between the rockshafts 15, 16 and the longitudinal axis thereof is not horizontal and thus parallel to the longitudinal axis of the rockshafts 15, 16 but rather is slightly inclined and extends upwardly and laterally outwardly from the plane containing the upper triangularly-shaped portion 25 of the mounting plate 23.

The selection of one of the arms 19, 20 and the subsequent swinging of the selected arm in one direction or the other to effect various speed ratio changes in the transmission is accomplished by means of a transmission shift control lever 29 which is adapted to be supported on the pivot pin in a manner which will be pointed out presently. The transmission control levers 29 extends through the floorboard of the vehicle body, not shown, and its uppermost end is positioned so as to be convenient for grasping by the operator of the vehicle. The transmission control lever 29 is provided with an enlarged generally cylindrical portion 30 intermediate its ends which has a cylindrical bore 31 extending therethrough. The outer metallic shell 32 of a bushing 33 is pressed into the bore 31 and has its ends projecting from each side of the enlarged portion 30. The bushing 33 fixed to the transmision control lever 29 includes an inner metallic shell 34 radially spaced from the outer shell 32 and a sleeve 35 of rubber or like material which is interposed between the inner and outer shells and is fixed thereto as by bonding or the like. The shank 26 of the pivot pin 27 extends through the inner shell 34 of the bushing 33 and is journaled therein for relative pivotal movement about the longitudinal axis of the pivot pin. The shank 26 is provided with annular groove adjacent its free end which is adapted to receive a contractible snap ring 36 for maintaining the transmission control lever 29 mounted on the pivot pin 27. From the foregoing, it will be appreciated that the transmission control lever 29 is mounted on the plate 23 for universal pivotal movement. The transmission control lever 29 is capable of pivoting about the longitudinal axis of pivot pin 27 by rotation of the inner shell 34 of the bushing 33 with respect to the pivot pin. Pivotal movement of the transmission control lever 29 about an axis perpendicular to the longitudinal axis of the pivot pin 27 is permitted since the rubber sleeve 35 of the bushing 33 is capable of deforming upon rocking of the inner shell 34 with respect to the outer shell 32, as illustrated in FIGURE 5. Inasmuch as the axis of the pivot pin 27 is oriented as described above, the transmission control lever 29 lies in a longitudinally extending plane which is slightly inclined with respect to a longitudinally extending vertical plane when the rubber sleeve 35 is in its undeformed state, as shown in FIGURE 4. Because of the inherent resilient characteristics of the rubber sleeve 35 movement of the transmission control lever 29 from the position shown in FIGURE 4 to the position shown in FIGURE 5 is yieldably resisted by the rubber sleeve. Thus, in effect, spring means are provided for urging the control lever 29 to the position shown in FIGURE 4.

Integrally formed with and extending generally radially in a diverging manner from the enlarged portion 30 of the transmission control lever 29 are a pair of legs 36, 37. The radial length of the leg 37 is greater than the radial length of the leg 36 and it will be noted that both legs 36, 37 are provided with oppositely extending offset portions 38, 39 respectively, intermediate their ends. As shown in FIGURE 2, the major or uppermost portions of the arms 19 and 20 are laterally spaced and parallel with respect to each other and the legs 36 and 37 extend into the space between the uppermost portions of the arms 19, 20.

Rigidly secured to the free or lowermost end of the leg 36 is a pin 40 having a generally semispherical head 41 disposed on the laterally outward side of the leg. In a similar manner, a pin 42 is secured to the lowermost end of the leg 37 and the generally semispherical head 43 integrally formed therewith is disposed on the laterally inward side of the leg.

As illustrated in the drawings, the arm 20 is provided with an elongated slot 44 which extends radially with respect to the rotational axis of the rockshaft 16. In a similar manner the arm 19 is provided with an elongated radially extending slot 45. The widths of the slots 44, 45 are substantially the same and each width dimension is slightly greater than the diameters of the semispherical heads 41, 43. The head 41 is insertable in the slot 44 formed in the arm 20 so as to drivingly connect the arm 20 and the shift control lever 29 and the head 43 is insertable in the slot 45 provided in the arm 19 to drivingly connect the control lever 29 and the arm 19. From the foregoing it is believed the operation of the transmission control mechanism is obvious. Assuming that the power transmission is in neutral and the drive shaft 11 is drivingly disconnected from the driven shaft 12, the arms 19 and 20 and the transmission control lever 29 are in the positions illustrated in FIGURES 1, 2, 3, and 4. The semispherical head 43 is disposed within the slot 44 formed in the arm 20 and the head 43 carried by the leg 37 is completely without the slot 45 and is laterally spaced between the arms 19, 20 and in lateral alignment with the slot 45. When it is desired to place the transmission in reverse gear, the transmission control lever 29 is rocked about an axis perpendicular to the longitudinal axis of the pivot pin 27 causing the semispherical head 41 to be withdrawn from the slot 44 and simultaneously causing the head 43 to be inserted in the slot 45. It will be appreciated that the resilient action of the rubber sleeve 35 must be overcome by the vehicle operator in order to effect such rocking of the transmission control lever 29. Once the transmission control lever 29 is operatively connected to the arm 19 and is in the position illustrated in FIGURE 5, the transmission control lever 29 is pivoted about the longitudinal axis of the pivot pin 27 to the position illustrated in FIGURE 7 which movement, because of the operative connection between the arm 19 and the leg 37 afforded by the cooperable head 43 and slot 45, causes the arm 19 to be swung in a clockwise direction, as viewed in FIGURE 1, to effect a reverse gear speed ratio in the transmission. It will be appreciated that since the head 41 was completely withdrawn from its cooperable slot 44 prior to swinging of the transmission control lever 29 to its reverse setting the arm 20 remains in its neutral setting position as illustrated in FIGURE 7, and the head 41 is not in transverse or lateral alignment with the slot 44. Consequently, even though the vehicle operator releases the transmission control lever 29 and the resilient action of the bushing 33 tends to yieldably rock the control lever 29 to the position shown in FIGURE 4 such movement is prevented since a flattened surface 46 on the head 41 engages the inwardly facing surface 47 of the arm 20 and maintains the head 43 in the slot 45. To again place the transmission in neutral, the transmission control lever 29 is pivoted in a clockwise direction, as viewed in FIGURE 7, causing the arm 19 to be swung in a counterclockise direction and the head 41 to move with respect to the arm 20, until the head 41 is in lateral alignment with the slot 44 whereupon the spring effect of the bushing sleeve 35 of rubber urges the head 41 into the slot 44 and the head 43 is simultaneously withdrawn from the slot 45.

When it is desired to condition the vehicle transmission for forward travel of the vehicle, the vehicle operator grasps the transmission control lever 29 and pivots the same from the position shown in FIGURE 3 to the position shown in FIGURE 6. However, prior to such pivotal movement of the lever 29 about the longitudinal axis of the pivot pin 27 the control lever 29 is rocked about an axis perpendicular to the longitudinal axis of the pivot pin 27 to insert the head 43 into the slot 45 and to simultaneously withdraw the head 41 from engagement with the slot 44. When the arm 19 is in the position shown in FIGURE 6 a first or low speed forward drive ratio is effected in the transmission. The intermediate or second speed gear ratio is obtained by pivoting the transmission control lever 29 in a counterclockwise direction from the position shown in FIGURE 6 to the position shown in FIGURE 8. At the commencement of such pivotal movement of the transmission control lever or when the transmission is conditioned for a first or low speed forward drive relationship between the drive shaft 11 and driven shaft 12 the enlarged semispherical head 41 is disposed at one end of an arcuate groove 48 formed in the surface 47 of the arm 20. The groove 48 has a radius of curvature substantially equal to the distance between the head 41 and the longitudinal axis of the pivot pin 27 and is partially defined by a laterally inclined surface or ram 49 which has one end thereof merging into the inwardly facing surface 47 and its opposite end at the slot 44 spaced laterally outwardly from the inwardly facing surface 47. The groove 48 serves as cam means for the head 41 during pivoting of the transmission control lever 29 from the position shown in FIGURE 6 to the position shown in FIGURE 3 and as cam means for rocking the control lever 29 against the spring effect of the rubber sleeve 35 when pivoted from the position illustrated in FIGURE 3 to the position shown in FIGURE 6. It will be appreciated that during such movement the flattened surface 46 slides on the inclined surface 49 and is maintained in abutting engagement therewith by virtue of the spring effect of the rubber sleeve 35. As the control lever 29 is being pivoted from the position shown in FIGURE 6 toward the position illustrated in FIGURE 3, the head 43 is being withdrawn from the slot 45 and when the control lever 29 is in the position (neutral position) illustrated in FIGURE 3, the head 41 is yieldably urged into the slot 44 and the head 43 is out of driving engagement with the arm 19. Thereafter, continued pivotal movement of the control lever 29 in a counterclockwise direction from the neutral position to the position shown in FIGURE 8 effects a second or intermediate forward speed ratio in the transmission. The high or third speed ratio is obtained merely by pivoting the control lever 29 in a clockwise direction from the position shown in FIGURE 8 to the position shown in FIGURE 9. From the foregoing, it will be appreciated that it is only necessary to exert a lateral force on the control lever 29 when conditioning the transmission for reverse speed and for first forward speed. All the other speed ratio changes are obtained merely by pivoting the control lever 29 about the longitudinal axis of the pivot pin 27. Furthermore, at the commencement of the operation to place the transmission in first or low gear, it is only necessary to apply a lateral force on the control lever 29 of sufficient magnitude to position the surface 46 of the head 41 in substantially the same vertical plane as the end portion of the groove surface 49 adjacent the slot 44 and to cause the head 43 to enter the slot 45.

Thereafter it is not necessary for the vehicle operator to maintain lateral pressure on the transmission control lever 29 since the transmission control lever 29 is rocked against the resilient action of the rubber sleeve 35 merely upon pivoting of the control lever about the longitudinal axis of the pivot pin 27.

The embodiment of the invention chosen for the purposes for illustration and description herein is that preferred for achieving the objects of the invention and developing the utility thereof in a most desirable manner, due regard being had to existing factors of economy, simplicity of design and construction and the improvement sought to be effected. It will be appreciated, therefore, that the particular structural and functional aspects emphasized herein are not to exclude but rather to suggest other adaptations and modifications of the invention as fall within the spirit and scope of the invention as defined in the appended claims.

What is claimed is:
1. Control means for a power transmission having a housing provided with a vertical wall through which a pair of transversely extending longitudinally spaced and parallel rockshafts project, each of said rockshafts being individually rockable in opposite directions from a neutral position to two other positions to establish two different speed ratios in the transmission, comprising, a pair of platelike arms, each of said arms being rigidly fastened to the outer end of a respective rockshaft and having a transversely offset portion thereof spaced and parallel to the offset portion of the other arm, said portions lying in parallel, vertical planes perpendicular to the longitudinal axes of said rockshafts, each of said offset portions having a radially extending, elongated slot formed therethrough; a mounting plate secured to said vertical wall having a pivot pin affixed thereto, said pivot pin being vertically spaced above and longitudinally spaced between said arms, the longitudinal axis of said pivot pin being inclined with respect to a horizontal plane contaning said longitudinal axes of said rockshafts; a gear shift control lever having a pair of diverging legs at one end thereof, the free end of each of said legs being transversely spaced between said arms and each having a semispherical head secured thereto, each of said heads being in transverse alignment with a respective slot when said rockshafts are in their neutral positions and said lever is in a neutral setting; and means for mounting said lever on said pin for rocking movement from its neutral setting about an axis perpedicular to the longitudinal axis of the pin whereby each of said heads is selectively insertable in the slot of a respective arm to drivingly connect the gear shift control lever and arm, said control lever being pivotal about the longitudinal axis of said pin to rock the arm having the head disposed in the slot thereof, said means for mounting said lever on said pin including resilient means yieldably urging the head of one of said legs toward one of said arms.

2. Control means for a power transmission as set forth in claim 1, wherein said control lever has a bore extending therethrough adjacent the junction of said legs and said means for mounting said lever on said pin includes a cylindrical bushing having an outer metallic shell extending through and rigidly secured to the surface defining said bore, an inner metallic shell having said pin journaled therein, and a sleeve of non-metallic, resilient material interposed between and rigidly secured to said inner and outer sleeves.

3. Control means for a power transmission as set forth in claim 1, including cam means carried by a surface of one of said arms and engageable by one of said heads during pivotal movement of said lever in one direction from its neutral setting to rock said lever about said axis perpendicular to the longitudinal axis of said pin against the resilient action of said resilient means.

4. Control means for a power transmission as set forth in claim 3, wherein said one of said heads has a flattened surface and said cam means includes an arcuate groove formed in a surface of one of said arm offset portions and having one end opening into the radially extending slot thereof, the bottom of said groove being defined by an inclined surface and adapted to have said flattened surface of said one head slide thereupon during pivotal movement of said lever in said one direction from its neutral setting.

5. Control means for a power transmission having a pair of spaced and parallel rockshafts, each of said rockshafts being individually rockable in opposite directions from a neutral position to two other positions to establish two different speed ratios in the transmission comprising, a pair of arms, each of said arms being rigidly fastened to a respective rockshaft and having a platelike portion thereof spaced and parallel to the platelike portion of the other arm, each of said platelike portions having a radially extending slot formed therethrough; a fixed pivot pin spaced from said arms having a longitudinal axis inclined with respect to a plane containing the longitudinal axes of said rockshafts; a gear shift control lever having a pair of diverging legs at one end thereof, the free end of each of said legs having a semispherical head secured thereto, each of said heads being in alignment with a respective slot when said rockshafts are in their neutral positions and said lever is in a neutral setting; and means for mounting said lever on said pin for rocking movement from its neutral setting about an axis perpendicular to the longitudinal axis of the pin whereby each of said heads is selectively insertable in the slot of a respective arm to drivingly connect the gear shift control lever and arm, said control lever being pivotal about the longitudinal axis of said pin to rock the arm having a head disposed in the slot thereof, said means for mounting said lever on said pin including resilient means yieldably urging the head of one of said legs toward one of said arms.

6. Control means for a power transmission as set forth in claim 5, wherein said control lever has a bore extending therethrough adjacent the junction of said legs, and said means for mounting said lever on said pin includes a cylindrical bushing having an outer metallic shell extending through and rigidly secured to the surface defining said bore, an inner metallic shell having said pin journaled therein, and a sleeve of nonmetallic, resilient material interposed between and rigidly secured to said inner and outer sleeves.

7. Control means for a power transmission as set forth in claim 6, including cam means carried by a surface of one of said arms and engageable by one of said heads during pivotal movement of said lever in one direction from its neutral setting to rock said lever about said axis perpendicular to the longitudinal axis of said pin against the resilient action of said resilient means.

8. Control means for a power transmission having a pair of arms; means for supporting each of said arms for individual rocking movement about a generally horizontal transversely extending axis in opposite directions from a neutral position to two other positions to eestablish two different speed ratios in the transmission, the rocking axes of said arms being spaced and parallel with respect to each other and lying substantially in a horizontal plane; lever supporting means vertically spaced above said horizontal plane and horizontally spaced between said rocking axes for said arms; a control lever having a pair of diverging legs at one end thereof mounted on said lever supporting means, said lever having a neutral setting wherein the free end of each leg is transversely spaced between the planes of said arms in transverse alignment with a respective arm when said arms are in their neutral positions, said lever when in said neutral setting being movable on said lever supporting means in one plane between a first position wherein one of said legs is drivingly connectable to one of said arms and a second position wherein the other of said legs is drivingly connectable to the other of said arms, said control lever further being pivotable with respect to said lever supporting means about an axis contained in said one plane and inclined with respect to the horizontal plane containing the rocking axes of said arms to effect rocking of the arm drivingly connected to a respective leg thereof; and resilient means yieldably urging the free end of one of said legs of said lever toward one of said arms.

9. Control means for a power transmission as set forth in claim 8, wherein said lever supporting means includes a fixed pivot pin having a longitudinal axis coaxial with the pivotal axis of said lever and said lever has a bore extending therethrough adjacent the juncture of said legs, and said means yieldably urging the free end of one of said legs toward one of said arms includes a cylindrical bushing having an outer metallic shell extending through and rigidly secured to the surface defining said bore, an inner metallic shell having said pin journaled therein, and a sleeve of non-metallic resilient material interposed between and rigidly secured to said inner and outer sleeves.

10. Control means for a power transmission as set forth in claim 9, including cam means carried by a surface of one of said arms and engageable by a surface carried by the free end of one of said legs during pivotal movement of said lever in one direction from its neutral setting to rock said lever about said axis perpendicular to the longitudinal axis of said pin against the resilient action of said resilient means.

11. Control means for a power transmission as set forth in claim 10, wherein said cam means includes an arcuate groove formed in a surface of one of said arms, the bottom of said groove being defined by an inclined surface and adapted to have said surface carried by said free end of one of said legs slide thereupon during pivotal movement of said lever in said one direction from its neutral setting.

References Cited in the file of this patent
UNITED STATES PATENTS

| | | |
|---|---|---|
| 2,613,551 | Robinson | Oct. 4, 1952 |
| 2,853,895 | Bixby | Sept. 30, 1958 |
| 2,961,890 | Marshall | Nov. 29, 1960 |
| 3,022,678 | McCordic | Feb. 27, 1962 |